United States Patent [19]
Feldman

[11] Patent Number: 4,476,462
[45] Date of Patent: Oct. 9, 1984

[54] USE OF CONTEXT TO SIMPLIFY TWO-DIMENSIONAL COMPUTER INPUT

[75] Inventor: Alfred P. Feldman, Columbia, Md.

[73] Assignee: The United States of America as represented by the Department of Health and Human Services, Washington, D.C.

[21] Appl. No.: 321,689

[22] Filed: Nov. 16, 1981

[51] Int. Cl.³ .............................................. G09G 1/16
[52] U.S. Cl. ................................... 340/711; 340/709; 340/721; 340/789
[58] Field of Search ............... 340/706, 709, 711, 721, 340/740, 744, 720, 748, 749, 750, 789, 723, 724, 747

[56] References Cited

U.S. PATENT DOCUMENTS

| | | | |
|---|---|---|---|
| 3,559,208 | 1/1971 | DiGiugno et al. | 340/717 |
| 3,623,068 | 11/1971 | Horgan et al. | 340/789 |
| 3,678,497 | 7/1972 | Watson et al. | 340/735 |
| 3,786,478 | 1/1974 | King, Jr. | 340/728 |
| 4,063,232 | 12/1977 | Fernald | 340/711 |
| 4,085,443 | 4/1978 | DuBois et al. | 340/709 |
| 4,195,338 | 3/1980 | Freeman | 340/724 |

Primary Examiner—Marshall M. Curtis
Attorney, Agent, or Firm—Holman & Stern

[57] ABSTRACT

The number of key strokes required to enter two-dimensional figures, such as chemical structures, into a computer from a keyboard display is reduced by utilizing contextual relationships between the character being typed at a specific location and the characters surrounding that location to predict the next character and/or location of that character to be typed. For example, when a horizontal bond between chemical elements is to be typed, the keyboard carriage moves horizontally to the next position, as with a conventional keyboard; but when a vertical or diagonal bond is typed, the carriage moves in the direction of the bond. In addition, symbols representing various atoms are predicted and automatically displayed at a next position location following typing of a bond when the contextual relationship at that location so requires.

17 Claims, 44 Drawing Figures

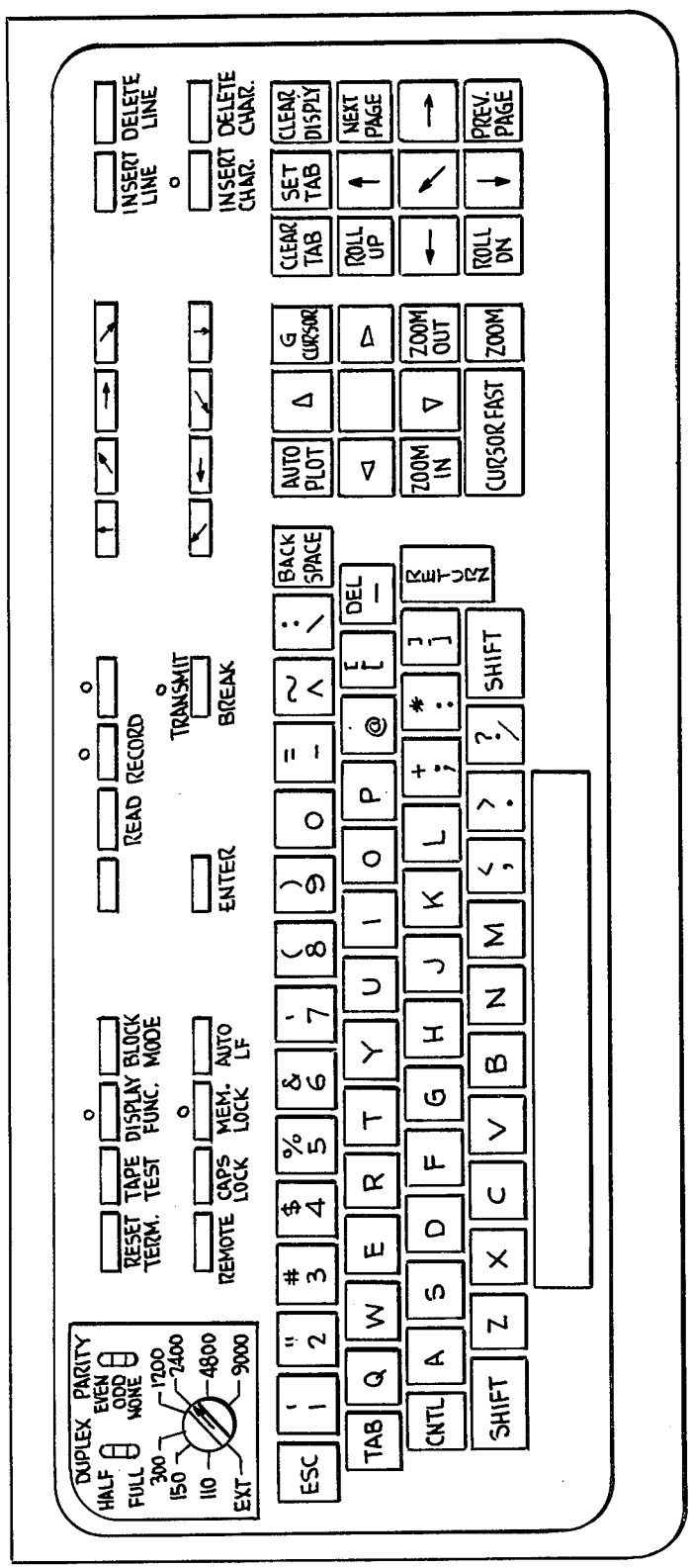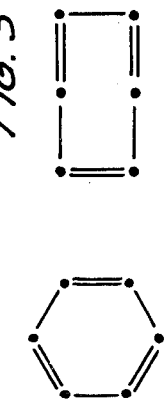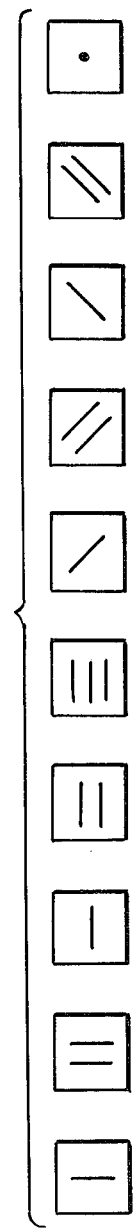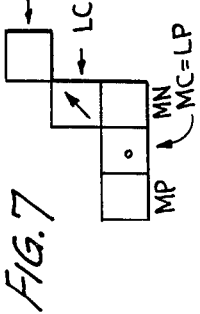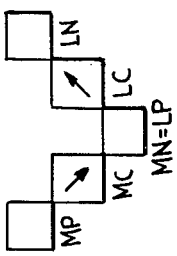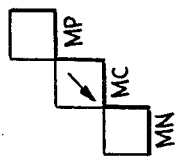

USE OF CONTEXT TO SIMPLIFY TWO-DIMENSIONAL COMPUTER INPUT

TECHNICAL FIELD

The present invention relates to a method for typing and displaying two-dimensional figures such as chemical structures. More specifically, the present invention relates to a method for minimizing the number of key strokes required to enter a two-dimensional figure into a computer for display at a computer-controlled display unit, such as a cathode ray tube (CRT), and for encoding it.

BACKGROUND OF THE INVENTION

Keyboards have been developed to facilitate entry of digital data into machines. Initially, keyboards were utilized with typesetting machines, then with typewriters and teletype machines and finally with computers and CRT displays. The entry of data in this manner is known as "keyboard entry" or "keyboarding" or simply as "typing". The display resulting from typing is called "typescript". In order to improve keyboard efficiency (that is, in order to minimize the number of strokes required to enter a given character or set of characters), several functions are usually performed by the actuation of a single key on a keyboard. Specifically, these functions may include: (a) selection of an individual character; (b) positioning the character at a specified location; (c) printing the character on paper, or displaying it on a CRT (in the description provided herein the term "printing" will refer to either of these features); (d) generation of a binary code; (e) storing a code in a buffer memory, tape or disc in machines which include such devices; (f) transmitting the code over a communication line if the machine is connected to such a line; and (g) interpretation of the code in a computer if the device is connected to such a computer.

Not all keys are coupled in the same manner. Thus, actuation of a "print" key may cause a character to be printed, coded and stored and the carriage to advance; actuation of the carriage-return key may couple the return motion of the carriage with the transmission of the contents of a buffer memory over a communications line. Still other features are employed to improve input efficiency. A key may select one character or, as in the case of the "shift" it may select a whole set of characters. To minimize the effort of positioning characters, the placement of the characters is constrained, unalterably, to an invisible grid which usually has fixed, discrete dimensions. Any character can be positioned in any grid location. The horizontal dimension of a rectangle in this grid, expressed as the number of characters per inch, is called "pitch"; the vertical dimension is the spacing between the lines. Together, these two values yield the "aspect ratio" of the output. Characters can be positioned only in the rectangles of this grid, not anywhere else. At these allowed locations, characters can be positioned either automatically (for example, by the escapement that follows actuation of the preceding print key) or manually (for example, by depressing the space bar, carriage return or backspace keys).

Although printing and positioning are separate functions, printing is usually coupled to the positioning function in conventional typewriters. This particular combination is efficient, however, only for linear text (that is, text where the characters follow each other, and further are disposed in respective printed lines). However, for two-dimensional data (for example, chemical structures) keyboard input by this means is cumbersome and tedious and requires an inordinate number of key strokes. This may be illustrated with reference in FIGS. 1, 2, and 3 and the description in the following paragraphs.

For entering simple linear text material, a typist can enter six (6) characters using (6) key strokes. For example, the word "mother" requires one (1) key stroke for each letter entered. Two-dimensional chemical structures, however, require more key strokes than there are characters in order to properly move the carriage in two dimensions. In addition, it is conventional to employ ten (10) special chemical symbols in order to type such chemical structures, these symbols being illustrated in FIG. 1. It is noted that nine (9) of the symbols represent various directionally-oriented single, double, and triple bonds. The last symbol is the so-called Luhn dot, which has conventionally been utilized to replace a carbon atom and its associated hydrogen atoms. FIG. 2 illustrates the benzene ring utilizing the Luhn dot convention to replace the six carbon atoms. Utilizing a conventional keyboard, modified by inclusion of the ten (10) special chemical symbol keys illustrated in FIG. 1, typing of the benzene ring of FIG. 2 requires thirty-four (34) key strokes. This large number of key strokes is required to type the relatively simple benzene ring structure because the standard typewriter mechanism requires multiple machine functions (such as backspace, reverse line feed, carriage returns, etc.) to be incorporated between typing of the actual symbols.

In order to reduce the number of key strokes required to enter two-dimensional chemical structures, symbols have been combined in pairs, whereby both are printed by the actuation of a single key. Symbols have also been designed to print beyond the boundaries of their display grid location, either partially or entirely. Alternatively, typists may distort input structures to make them more linear, such as the distorted benzene ring structure illustrated in FIG. 3. The number of key strokes required to type the distorted benzene ring structure of FIG. 3, using a standard keyboard modified by the inclusion of the ten (10) special keys of FIG. 1, is twenty-six (26).

An entirely different approach (used, for example, by the Chemical Abstracts Service) employs a menu of pre-established fragments to build-up a chemical structure. A subset of the menu is displayed along a margin of a CRT screen. The typist selects a desired fragment, utilizing a light pen or similar device and positions a copy of it elsewhere on the screen in the same manner. A chemical structure is built-up by repeatedly selecting and positioning fragements in this way. This method has both advantages and disadvantages. The main advantage is that entire fragments can be selected on sight without having to be assembled from individual bonds and characters. A major disadvantage resides in the fact that the limited space on the screen permits only a limited number of fragments to be displayed. Consequently, the menus must constantly be interchanged. Even so, the structure being built-up must be modified from the keyboard to substitute atoms and to enter structures not available on the menu. Borrowing from both the light pen and conventional keyboard entry technologies, this approach remains complex. Further difficulties are encountered where the free-hand drawing of a bond on the screen is necessary. Two lines, intended to interconnect, may actually fail to do so by a miniscule amount. The user may believe that they meet, but the machine will not detect it. Alternatively, a shortline segment produced when a connection is overshot, might be interpreted by the computer as a new bond. These difficulties can be avoided by constraining such input to the digital grid or by making the typist verify the computer's interpretation of the input. These constraints further reduce the appeal of this approach.

SUMMARY OF THE INVENTION

It is a primary object of the present invention to provide a method for reducing the typing effort, measured in key strokes, for entering two-dimensional structures into a computer-controlled display. It is a further object of the present invention to simplify entry and display of two-dimensional chemical structures. It is still another object of the present invention to provide a method for entering and displaying two-dimensional structures from a keyboard into a computer-controlled display, the method being such as to be easily learned and utilized by relatively unskilled personnel.

In accordance with the present invention, the contexual relationships of a keyboard-entered character to the surrounding display grid locations are used to make certain predictions which effect various control functions and displays of characters which are not necessarily entered from the standard keyboard. Many manufacturers of CRT terminals make available "user-programmable" keys in addition to the standard keys. For the present invention, eight (8) such keys are used to generate, when used, eight (8) directional symbols (i.e., chemical bonds), the directions corresponding to the eight (8) grid locations surrounding any given grid location. The directional symbols, when entered into the computer, automatically effect various machine controlled functions, some of which are based on the context in the display. The method makes use of the electronic memory and logic circuitry which resides in a computer terminal or a remote computer to make the various predictions. The method takes advantage of the electronic refresh circuitry in such terminals to display predicted characters and permit the user to retain or replace the predicted character. If the prediction is correct, the typist is saved key strokes that would otherwise have been required. In the case of chemical structures, since most atoms are carbon and hydrogen, these are utilized in the disclosed embodiment as the predicted characters. Retention and replacement of predicted characters is simplified by alternating atoms and bonds in the display. If, after the machine displays an atom, the user types a bond, the atom is retained and the bond is attached to it. If, however, the user disagrees with the prediction made by the machine, the user can type in another atom which will then replace the predicted atom.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings, wherein:

FIG. 1 illustrates (10) special keys utilized in certain prior art approaches to typing two-dimensional chemical structures;

FIG. 2 is a diagram of a benzene ring utilizing the Luhn dot convention;

FIG. 3 is a distorted diagram of a benzene ring showing how one might reduce the number of key strokes utilizing prior art techniques;

FIG. 4 is a plan top view of a computer terminal keyboard, modified to operate in accordance with the present invention;

FIGS. 5, 6, and 7 represent, diagrammatically, adjacent display grid locations and their relationships within the context of the present invention;

DESCRIPTION OF THE PREFERRED EMBODIMENT

Figure 8A:
FIGS. 8(a), (b), (c), (d), (e), (f), (g) and 8(h) illustrate the various sequential steps in the present invention which occur when the preceding position contains an alphanumeric character and the symbol actuated is a bond or another alphanumeric character.
Figure 8B:
Figure 8C:
Figure 8D:
Figure 8E:
Figure 8F:
Figure 8G:
Figure 8H:

The present invention is disclosed in a preferred embodiment utilizing a standard version of the Model HP 2648A Graphics Terminal Keyboard manufactured by the Hewlett-Packard Company of Palo Alto, Calif. in conjunction with a DEC SYSTEM 10 computer manufactured by the Digital Equipment Corporation. A listing of instructions for a specific program embodying the present invention with the aforementioned equipment is provided in Appendix I attached hereto. It is to be understood that the equipment and program specifically described and illustrated herein are examples of a preferred embodiment only; in other words, the present invention can be performed with other equipment and other programs and should not be limited to the specific embodiment disclosed herein.

In order to determine what functions are to be coupled to a key, the present invention makes use not only of the identity of the actuated key and of the information derived from the input sequence of data (as is the case for conventional keyboard devices), but also makes use of the context of the information already printed or displayed. In order to understand what is meant by context, the following description is provided. Whether a particular key causes a display in upper or lower case is a factor determined by the last setting of the shift key. When two functions are coupled to one another, as when one key produces both a printed character and an escapement, that also results from a past event. Context, on the other hand, refers to what presently surrounds the display grid location at which an intended character is to be displayed. Context ignores past history. For example, maneuvering a car on the highway is influenced by context; it matters only what cars are in the vicinity, not how they got there. Within a line of text, the context of a character is the characters located to its left and its right. In conventional linear typing, contextual relationships are unimportant and are ignored. In two-dimensional typing, however, the entire area surrounding a character becomes its context and the present invention employs these contextual relationships to reduce typing effort.

The present discussion considers context by reference to what appears on the typescript or on a CRT display. It should be understood, however, that the logic circuitry which performs the methods of the present invention views this context only inside a computer memory where an equivalent representation of the structure, as displayed, is available.

It is to be understood, that although the present invention is described in terms of displaying two-dimensional chemical structures, the concepts described herein are applicable to other two-dimensional structures and should not be limited to chemical structures.

A. SPECIAL SYMBOLS

In accordance with the present invention, special symbols are required to effect directional symbology. In the case of chemical symbols, these directional symbols are the chemical bonds. The term "symbol" or "element" is used herein to refer to both alphanumeric characters and bonds; the Luhn dot is considered as an alphanumeric character. The Luhn dot is employed in the present invention as are the chemical bond symbols illustrated in FIG. 1. In addition, the present invention employs some additional bond types, namely: resonating, tautomer and stereo bonds. The four (4) basic directional orientations for the chemical bonds are retained as in the prior art; however, the present invention has fundamentally changed the manner in which they are actuated as described below.

A.1. Definition Of "Next Position"

On conventional typewriters and CRT keyboards, a symbol is normally followed, automatically, by a carriage advance. If, on such a machine, chemical bonds are introduced, these would be followed by a carriage advance as well. However, the conventional horizontal carriage advance applies only to the horizontal bond if the carriage is to be properly positioned for the character following that bond. All other bonds require vertical adjustment of some kind. In accordance with the present invention, a carriage advance does not automatically follow every bond. Rather, the next position is determined independently and depends upon the orientation of the bond. Thus, for the horizontal bond, the next position coincides with the position that the carriage advance would normally take in a linear keyboard; however, for a vertical or diagonal bond, the next position involves vertical movement of the carriage. In machines that do not have a carriage, all the foregoing applies to the movements of the cursor.

A.2. Directionality Of Bonds

Since, as described above, the direction of bonds specifies the next position, the present invention provides two (2) bonds for every bond orientation, each of the two bonds being in opposite directions. Thus, there are two (2) horizontal bonds, one pointing to the right, the other pointing to the left. Likewise, there is a vertical bond pointing upward and a vertical bond pointing downward. Similarly, there are four (4) diagonal bonds, each having its own 45° orientation. There are, therefore, eight (8) directional bonds employed in the method of the present invention. Referring to FIG. 4, an HP 2648A graphics terminal keyboard is illustrated, using the user-programmable keys for effecting the directional bonding input from the keyboard. These keys are designated with the eight (8) directional arrows and appear adjacent the editing keys near the upper righthand corner of the keyboard in FIG. 4. It is noted that bond directionality is meaningless in chemistry; such directionality is utilized herein solely for the sake of flexibility in keying a structure into the computer.

B. PAST-HISTORY RELATIONSHIPS

B.1. Additional Precedence Codes

Since eight (8) keys are utilized to denote the eight (8) bond directions, the present invention utilizes a precedence code to indicate bond types (i.e., whether the bond is a single, double, alternating, etc., type of bond). Table I illustrates the types of bonds used in the present invention. The precedence code is simply a number, typed just prior to depressing the key representing the bond. If followed by a key other than a bond, display displayed. If followed by a key other than a bond, display is delayed. If a number does not precede a bond key, a default situation is assumed which depends on past history. The default is normally a single bond, but it can also be set up to be an alternating bond, no bond at all (i.e., a space), or an erasure. Entering these bonds once causes them to be set. All other bonds revert to singles after one actuation. The insertion of a double bond is illustrated with key strokes 9 and 10 related to the example described in relation to FIGS. 11-30 hereinbelow.

TABLE I

Numerical Precedence Codes Used To Indicate Bond Types

Number 0 indicates a no bond (move only) (\*)
Number 1 indicates a single bond (\*)
Number 2 indicates a double bond
Number 3 indicates a triple bond
Number 4 indicates alternating bonds (\*)
Number 5 indicates a stereo bond up (dotted line)
Number 6 indicates a stereo bond down, wedge in
Number 7 indicates a stereo bond down, wedge out
Number 8 indicates a tautomer
Number 9 indicates an erase bond (\*)
(\*)Indicates bonds that will remain set until countermanded. All other bonds revert to single after one actuation.

B.2. Reversal Of Print And Positioning Function Sequence

Since the positioning of a bond is determined by context, it is efficient to determine the intended position of any symbol after its key is actuated, there upon to move to this position and then to print the symbol. In conventional or linear typewriters, the character is always printed first; spacing follows. The present invention allows the typist to override the positioning obtained by context. This is accomplished by utilizing the space or backspace keys, or by utilizing special positioning keys available on some machines.

C. CONTEXT RELATIONSHIPS

The present invention determines both "a priori" context and "a posteriori" context. The "a priori" context refers to conditions as they exist prior to the placement of the symbol. Depending upon circumstances, these conditions determine the nature of the displayed symbol and the location of the displayed symbol. The "a posteriori" context refers to conditions as they exist following the printing of a symbol; such conditions may cause additional characters to be printed and, on a CRT, some characters to be erased.

C.1 "A Priori" Context

"A priori" context is determined by examination of the display grid location at which a symbol is to be printed and of the surrounding grid locations. "A priori" context is evaluated in relation to the symbol (alphanumeric character or bond, that has been actuated). The present invention recognizes three (3) positions with respect to a symbol that is printed: its preceding position, its actual position, and its following or next position. For example, in the work "mother", the position of the "o" precedes the actual position of the "t", and the position of the "h" follows it. Table II provides an explanation of symbols employed in defining the various positions considered in the present invention.

With respect to a symbol to be typed, the following context influences its placement:

(a) If the preceding position is blank (which occurs when beginning a structure or following spacing), the actuated symbol is printed. If the symbol is a bond, it is preceded by a Luhn dot.

(b) If the preceding position contains a character, and if it is a character that has been actuated, escapement takes place first, then the new character is printed.

(c) If the preceding position contains a character or a subscript, and the character actuated is a numerical character, then that numeral will be printed as a subscript following escapement.

(d) If the preceding position contains a Luhn dot, and the symbol actuated is a character then the character replaces the Luhn dot.

(e) If the preceding position contains a character, and the symbol actuated is a bond, then the bond will be so positioned that the character precedes it. If the preceding position contains a bond, and the symbol actuated is a character, then the character will be located at the end of the bond, whichever way it may point. FIGS. 8(a)-8(h) illustrate all of the possible arrangements. Specifically, automatic positioning of a bond, with respect to a character, and of a character, with respect to a bond, is illustrated in these figures. In all eight (8) instances, the sequences is entry of letter A, entry of the bond, and entry of the letter B. Thus, in FIG. 8(a), the letter A is entered, followed by a vertical bond. The vertical bond is automatically located in accordance with the present invention, above the letter A because of the directional nature of this vertical bond. If a downwardly directional vertical bond had been entered, the bond position illustrated in FIG. 8(e) would be effected. Considering FIG. 8(a) again, subsequent entry of the letter B results in display of that letter at the forward end of the upwardly directed vertical bond. Thus, depending upon which of the eight (8) directional bond symbol keys is depressed after entry of the letter A, the bond and the subsequently entered letter B are oriented in one of the eight (8) possible directions relative to the initially entered letter A. Each of the letters A and B, and the intervening bond symbol have their own display grid locations.

Figure 9A:
FIGS. 9(a), (b), (c), (d), (e), (f), (g) and 9(h) illustrate the various possible sequences which occur in accordance with the present invention when the preceding position contains a bond and the actuated is a bond.
Figure 9B:
Figure 9C:
Figure 9D:
Figure 9E:
Figure 9F:
Figure 9G:

(f) If the preceding position contains a bond, and the actuated symbol is a bond identical to it in orientation and type, then the new bond will be so positioned as to extend the existing bond. This is illustrated in FIG. 9(d), wherein the letter A is initially entered and followed by two (2) subsequent horizontal bonds. It is to be noted that ommission of entry of the "bond type" control number in this circumstance, does not enable the default condition. Thus, a double bond does not revert to single, but remains a double bond.

Figure 9H:

(g) If the preceding position contains a bond, and the actuated symbol is a bond with the opposite direction, this causes a reversal in the direction of the bond already displayed. This condition is illustrated in FIG. 9(h).

(h) If the preceding position contains a bond, and if the symbol actuated is a bond, different either in orientation or type, then the existing bond will be followed by a Luhn dot, and the new bond will be so positioned that the dot precedes it. This is illustrated in each of FIGS. 9(a), 9(b), 9(c), 9(e), 9(f), and 9(g).

(i) If the current position contains a bond and the actuated symbol is a bond, a new bond will not displace the older bond. Thus, two (2) bonds can cross.

As noted above, the determination of contextual relationships is overridden when manual positioning functions are used. This state is indicated to the typist by an appropriate display. In the program listing of Appendix I, the display for this condition is "Terminal Is DUMB".

C.2. "A Posteriori" Context

The precise rules governing chemical valence can be employed to compute the number of hydrogen atoms required by an atom after all other bondings have been keyed in to the display. Insertion of the hydrogen atoms is triggered by acutation of a space key, a return key, or by typing of a bond, all of which signify the completion of the particular atom. The description provided below with respect to FIGS. 11–30 includes several examples of this procedure. The system can monitor for the availability of sufficient space to enter the hydrogen atoms and can determine alternative locations, if required. If a CRT display with a "refresh" capability is employed, the system can alter any hydrogen atoms previously introduced. Should the typist return to an earlier position, the display hydrogen count, if any, can be altered. Key strokes 13–18 of the example described below with references to FIGS. 21–26 include examples of this feature.

D. TERMINAL KEYBOARD

For the specific HP 2648A terminal keyboard employed in the preferred embodiment, the indicated bond directional keys have associated codes which are downloaded under program control, using the soft key defining commands available for the terminal. Characters typed by the user are sensed, one at a time, together with their position, by transmission to the terminal of a command that both reads the cursor position and accepts a character. Between issuances of this command, the keyboard is interlocked. For the display of chemical structures in accordance with the present invention, the terminal's graphics memory is employed. Its alphanumeric memory, for which the display can be superimposed on the graphics display, is employed for messages to the typist. All commands employed in the program listing of Appendix I are found in the HP 2648A graphics terminal reference manual provided by the Hewlett-Packard Company as Part No. 2648-90002.

FIGS. 5, 6, and 7 are provided to illustrate the abbreviations and context relationships in Table II. Thus, in FIG. 5, the symbol being examined in the MC space is a bond. The MN and MP locations are automatically defined by the bond direction, in accordance with the definitions provided in Table II. In FIG. 6, a similar relationship between the display grid locations is illustrated for a bond appearing at the MC location.

TABLE II
Logic Diagram Of Context Relationships
Explanation of Abbreviations

| | |
|---|---|
| C | Position being examined, also referred to as "current position" (*). |
| P | Position preceding symbol (*). |
| N | Position following symbol, referred to as "next position" (*). |
| L | Symbol being actuated (*). |
| M | Symbol on typescript, located at position being being examined. This position is indicated by the cursor or equivalent. The cursor always indicates the "next" position. Thus, for characters, M will lie to the left of the cursor (*). Two bonds with the same C and with opposite directions. |
| [MC] | Symbol printed at location MC. |
| Q | Character denoting end of input. |
| SP | Space key. |
| BS | Backspace key (also other positioning functions). |

(*) These symbols can be used in combinations. Thus, MC designates the current position of the symbol being examined, NC the one next to it. Note that LC, LP and LN are hypothetical, referring to possible placements of the actuated symbols. (Unless otherwise indicated, symbols are printed at LC.)

In accordance with the present invention, a bond having a different direction, such as the bond appearing in the space designated LC is next entered, the computer program enters a sub-routine which defines the MN space as being identical to the LP space on the grid. A Luhn dot is automatically displayed at the MN=LP space. The directional orientation of the second bond determines the LC space orientation relative to the LP space and, the second bond is displayed in the LC space.

FIG. 7 illustrates the situation wherein a bond is entered into the machine when no element appears at the cursor location NC. The direction of the bond automatically indicates the orientation of the position of the LC grid location relative to the cursor location MC which is automatically made coincident with the LP location in accordance with the procedure of the present invention. A Luhn dot is automatically displayed at the MC location and the entered bond is displayed at the LC location.

E. FLOW CHART

Figure 10:
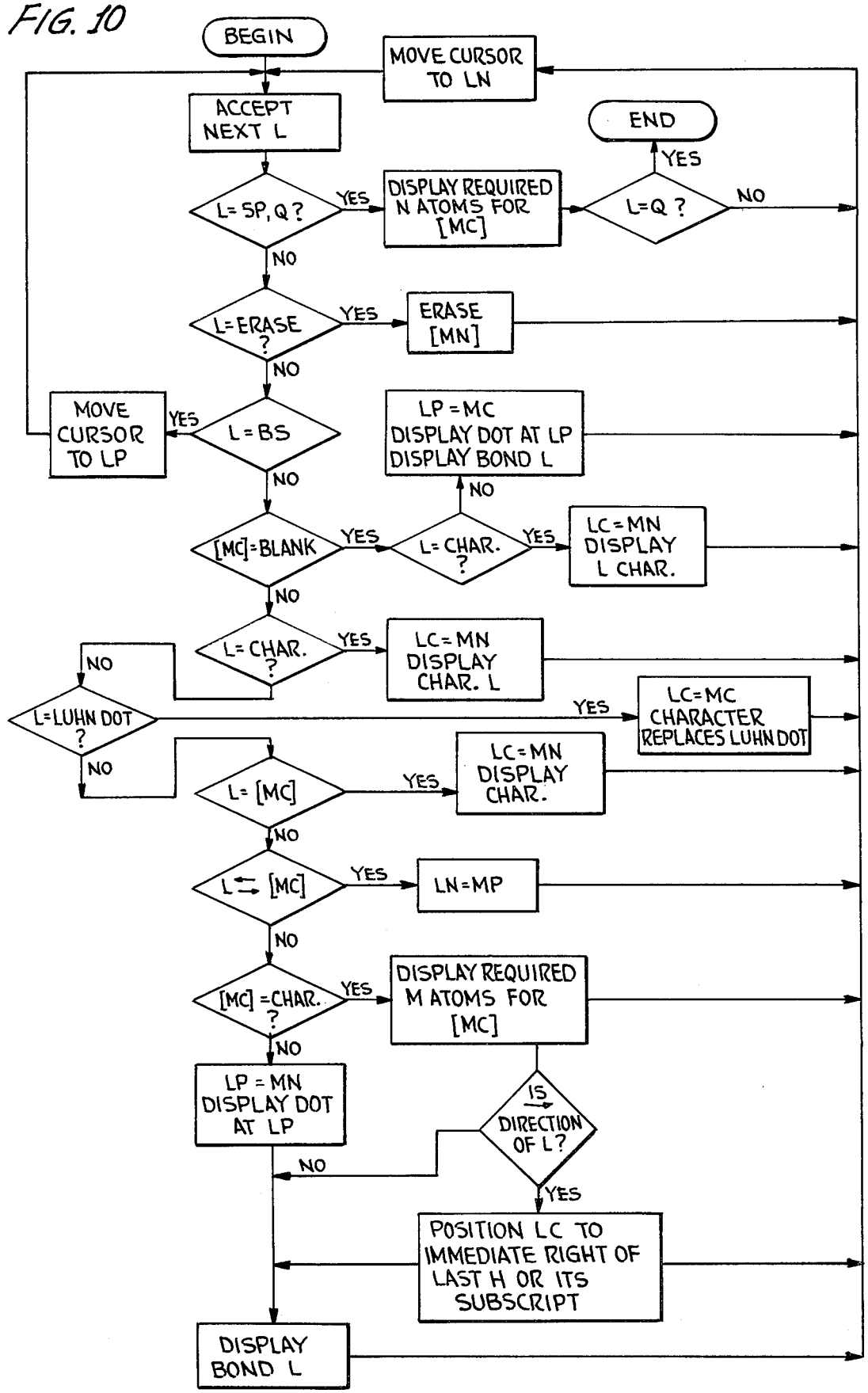
FIG. 10 is a flow chart representing the program which processes entered characters to achieve the improved method of display in accordance with the present invention.

The flow chart of FIG. 10 provides a diagrammatic illustration of the operation of the method of the present invention in response to various sequences of character entry. Thus, it is seen in FIG. 10 that when a character entry sequence is begun, the entered character, designated by the letter L in accordance with the convention set forth in Table II, is accepted. If the entered character is a space (SP) or an end of input character (Q), the program automatically enters its sub-routine to display the required number of hydrogen atoms adjacent the character appearing at the cursor location. The required number of hydrogen atoms is determined by the valence of the character appearing at the cursor location. After display of the required number of hydrogen atoms, the entered character L is examined to see if it is an end of input character; if so, the program terminates and the display sequence is at an end. If, instead, the entered character is a space, the cursor grid location is automatically moved one spaced forward.

If the entered character is an "erase" character, the character appearing in the MN location is erased and the cursor is moved one space accordingly. On the other hand, if the entered character is a backspace, the cursor is moved one grid location backward.

If a character is entered when the MC grid location is blank, and if the entered symbol is a character to be displayed, then the program enters a sub-routine wherein the LC grid location is made coincident with the MN grid location and the entered character is displayed at the LC location. The cursor is then moved to the LN location. If, on the other hand, with a blank MC space, the entered character is a bond or directional symbol, the program enters a routine whereby the LP space is made coincident with the MC space, a Luhn dot is displayed at the LP space and the entered bond is displayed at the LC space. The cursor is then moved accordingly to the LN space.

If the MC grid location is not blank, and if the entered symbol is a character to be displayed, the program enters its sub-routine whereby the LC grid location is rendered coincident with the MN grid location and the entered character is displayed at the LC location. Again, the cursor is moved to the LN grid location.

Proceeding on down the flow chart, if the entered symbol is not a character, meaning that it must be a bond or directional symbol, a determination is made as to whether or not that bond is identical to the bond appearing at the MC location. If such is the case, the computer enters the sub-routine whereby the LC grid location is rendered coincident with the LN location and the entered bond is displayed in the manner illustrated in FIG. 9(d).

If the entered character is a bond which is directionally opposite the bond appearing in the MC space, the program enters its sub-routine whereby the LN space is made coincident with the MP space, having the effect of skipping backover the MC space without displaying the entered bond. The cursor is then moved to the LN space as described above.

If the entered character is a bond, and none of the above conditions apply, and further if the MC grid location is an alphanumeric character, the program enters its sub-routine whereby the appropriate number of hydrogen atoms are displayed adjacent the MC character. If the orientation of the bond is other than horizontal and pointing to the right, the program enters its sub-routine whereby the LP space is rendered coincident with the MC space, whereby the entered bond is displayed and the cursor is moved to the LN location. If the orientation of the bond is horizontal and pointing to the right, the program enters a sub-routine whereby the LC position is assigned to the first grid position to the right of the last entered hydrogen, or its subscript. If the MC grid location does not contain an alphanumeric character, the sub-routine is entered whereby the LP space is rendered coincident with the MN grid location and a Luhn dot is displayed at the LP location.

F. EXAMPLE OF DISPLAY OF CHEMICAL STRUCTURE

Figure 11:

In order to best understand the operation of the present invention, reference is made to FIGS. 11–30 which illustrate the display occurring in response to specific key strokes entered from the keyboard terminal of FIG. 4. The sequential display is effected as follows. The first entered character is a bond directed upward to the left. Referring to the flow chart of FIG. 1, the program proceeds to the decision box designated [MC]=BLANK where it is determined that the MC grid location on the display is blank. It is then determined that the entered symbol L is not a character but a bond so that the sub-routine is entered whereby the LP grid location is made coincident with the MC grid location. The Luhn dot is displayed at the LP location and the entered bond is displayed at the LC location as illustrated in FIG. 11. In other words, both the bond and the Luhn dot are entered in response to a single key stroke from the keyboard.

Figure 12:
Figure 13:
Figure 14:
Figure 15:
Figure 16:

The second key stroke entered in the example is a diagonal bond oriented downward to the left. This time the flow chart proceeds down to the decision box designed [MC]=CHAR, where it is determined that the element located in the MC display grid location is not a character. The program then enters its sub-routine whereby the LP grid location is made coincident with the MN grid location and a Luhn dot is automatically displayed at the LP location. Since the entered bond is not oppositely directed to the bond in the MC grid location, the entered bond is displayed and the cursor is moved accordingly. Again, it is to be noted that the Luhn dot and the entered bond are automatically displayed in response to a single key depression. Thus, after two (2) key strokes, four (4) elements are displayed in respective display grid locations as illustrated in FIG. 12. If the third key stroke is a bond directed vertically downward, the same procedure follows as described above for the second key stroke whereby another Luhn dot and bond are automatically displayed as illustrated in FIG. 3. Subsequent entry of a diagonal bond oriented downward to the right, a diagonal bond oriented upward to the right, and a vertical bond oriented upward result in automatic displays of additional Luhn dots and the corresponding entered bonds, as illustrated in FIGS. 14, 15, and 16. Therefore, upon entry of only six (6) key strokes, twelve (12) symbols have been displayed. More importantly, only six (6) key strokes are necessary to display an entire benzene ring of the type illustrated in FIG. 2 and noted above as requiring thirty-four (34) distinct key strokes to be displayed.

Figure 17:

If the seventh key stroke is a horizontal bond directed to the right, the bond automatically appears to the right of the first entered Luhn dot as illustrated in FIG. 17. It is noted that this bond does not replace or superimpose itself on that dot, but rather jumps over it. In the flow chart of FIG. 10, this operation proceeds at the decision box designated [MC]=CHAR, wherein the decision is made that the MC grid location contains a character. The Luhn dot requiring no additional hydrogen atoms, the program proceeds to display the entered bond at the cursor location.

Figure 18:

If the eighth key stroke is a C character, designating a carbon atom, this character is automatically displayed, as illustrated in FIG. 18, adjacent the forward end of the last-entered bond. This operation may be followed on the flow chart of FIG. 10 beginning at the decision box designated L=CHAR which determines that the entered element is an alphanumeric character and initiates the sub-routine whereby the LC grid location is made coincident with the MN grid location and the entered character is displayed at the new LC location.

Figure 19:
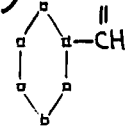

It is assumed that the nineth key stroke is a numeral 2. In accordance with the program, no display is made. The program awaits the next key stroke to determine if it is a bond. In other words, the numeral 2 is considered as a precedence code character which causes the next entered bond symbol to be a double bond. The tenth entered key stroke is a vertical bond directed upward. As illustrated in FIG. 19, this causes a double bond to be directed upward from the carbon atom. In addition, in order to complete the bonding for the carbon atom of known valence four (4), a hydrogen atom is automatically added to the molecule under consideration. In the flow chart, this operation proceeds from the decision box designated [MC]=CHAR.

Figure 20:
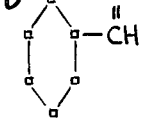
Figure 21:
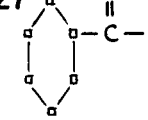

The next stroke enters the character O, which as seen in FIG. 20, appears at the forward end of the double bond entered in the previous step. This procedure follows from the decision box designated L=CHAR in the flow chart of FIG. 10.

The twelfth key stroke enters a bond directed vertically downward. There is no effect at the display in response to this bond since it is merely being used to reposition the cursor. Specifically, the decision box immediately below the decision box designated L=[MC] controls operation under these circumstances. Specifically, when it is determined that the bond associated with the location of the O character is oppositely directed to the entered bond, the program enters a sub-routine whereby the LN grid location is made coincident with the MP grid location and no display of the entered bond ensues.

The thirteenth key stroke is assumed to be a horizontal bond directed to the right. As illustrated in FIG. 1, this has the effect of eliminating the hydrogen atom entered in the step associated with FIG. 19 and replacing it with a horizontal bond. It is to be noted that the bond does not replace or superimpose the character C, but instead jumps over that character to replace the previously generated hydrogen designation. This operation ensues, in the flow chart of FIG. 10, from the decision box designated [MC]=CHAR, where it is determined that a modification of the hydrogen atoms is necessary and that the entered bond is to be displayed.

Figure 22:
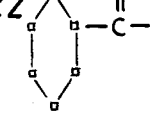

The next key stroke in the example enters the character C and results in a display of that character to the right of the last-entered bond as illustrated in FIG. 22. This operation ensues from the decision box designated L=CHAR in the flow chart of FIG. 10.

Figure 23:
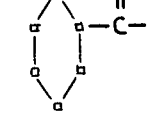

The fifteenth key stroke is assumed to be a diagonal bond oriented upward to the right. As illustrated in FIG. 23, entry of this bond has the effect of automatically adding two (2) hydrogen atoms to the last-entered carbon atom and also displaying the entered bond. This operation ensues from the decision box in the flow chart designated [MC]=CHAR, where it is designated that the MC grid location contains a character and that hydrogen atoms are required to be displayed in conjunction with that character before the next bond can be displayed.

Figure 24:
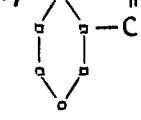
Figure 25:
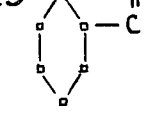

The sixteenth key stroke enters the character N which designates a nitrogen atom. This character is displayed at the forward end of the last-entered bond as illustrated in FIG. 24.

The seventeenth key stroke enters a diagonal bond oriented downward to the left. Since this is oppositely directed to the bond associated with the last-entered nitrogen atom, it is not displayed. However, two (2) hydrogen atoms are displayed in conjunction with the last-entered nitrogen atom in order to complete the valence requirements of the nitrogen atom.

Figure 26:
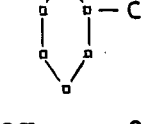

The eighteenth key stroke is a diagonal bond oriented downward to the right which, as illustrated in FIG. 26, causes the subscript 2 to be deleted from the hydrogen atom attached to the last-entered carbon atom. The bond is displayed in association with the carbon atom as illustrated in FIG. 26.

Figure 27:
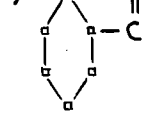

The nineteenth key stroke is a character C which is displayed, as illustrated in FIG. 27, at the forward end of the last-entered bond.

Figure 29:
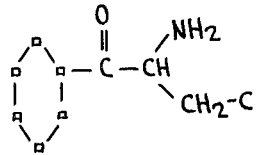
FIGS. 11, 12, 13, 14, 15, 16, 17, 18, 19, 20, 21, 22, 23, 24, 25, 26, 27, 28, 29 and 30 illustrate successive steps in the formation of a chemical structure in response to respective key strokes in accordance with the present invention.

The twentieth key stroke is assumed to be a horizontal bond oriented to the right. As illustrated in FIG. 29, entry of this bond has the effect of automatically adding two (2) hydrogen atoms to the last-entered carbon atom, and displaying the entered bond to the right of the hydrogen subscript. This operation ensues from the decision box in the flow chart designated [MC]=CHAR and from that following it, where it is determined that the MC grid location contains a character, and that hydrogen atoms are required to be displayed in conjunction with that character, and that the bond, being horizontal and oriented to the right, is to be positioned at the grid location to the right of the last hydrogen atom or its subscript.

The next stroke enters the character C, which as seen in FIG. 29, appears at the forward end of the bond entered in the previous step. This procedure follows from the decision box designated L=CHAR in the flow chart of FIG. 10.

Figure 28:
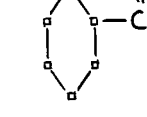

The twenty-second, and final character, is a Q which designates an end of the structure. In response to this character, the display, as illustrated in FIG. 28, incorporates three (3) hydrogen atoms in association with the last-entered carbon atom. In addition, the program routine is brought to an end. This procedure follows from the decision box designated L=SP, Q in the flow chart of FIG. 10.

Figure 30:
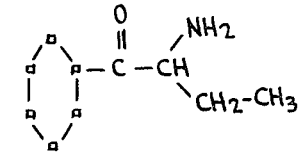

It is to be noted that the relatively complex structure illustrated in FIG. 30 is provided with only twenty-two (22) key strokes. This is to be compared with the thirty-four (34) key strokes required to display a simple benzene ring in accordance with prior art practices.

G. USER TRAINING

The method described herein emulates the manner in which chemists normally draw chemical structures, namely, an atom and a bond at a time. The use of a keyboard introduces relatively few additional conventions for the user to learn. These can be taught in a very few sessions. It has proven practical to program training sessions, accessible to the typist from the terminal, to provide him or her with hands-on experience sufficient for the use of the system. The first lesson already enables the typist to enter structures into a computer. Subsequent lessons deal with methods to make the input still faster and more versatile. These lessons are of less interest to the casual user; they are intended for the professional typist specializing in the input of structures. The present application describes the basic process.

H. OTHER APPLICATIONS

The input process described herein applies to chemical structures specifically. It may be used to simplify the drawing of these structures for publication. Graphs of chemical structures are also entered into computers for the purpose of obtaining coordinates of each atom and each bond so that the machine will be able to "understand" the structure and to classify it for search purposes, etc. The method described herein is particularly useful for this purpose, it being needed to grasp by the occasional user who wants to interact directly with a computer. It is also efficient for the professional typist with a large number of structures to enter. These two (2) applications, file and query input, are usually processed by separate programmers. The availability of a single routine, capable of dealing with both applications, reduces both overhead and maintenance of the system processing these structures.

The input process is compatible with the use of pre-established structures selected from a manual. In this case, it facilitates modification of the resulting structure, which usually will be necessary.

It should be noted, however, that the process is not limited to chemistry. Using other sets of special keys, it is applicable to other two-dimensional diiagrammatic data, such as electrical wiring and electrical circuits, mathematical formulae, geographical maps, and computer assisted designs. The key feature is the use of directional symbols, represented by the chemical bond in the specific example described herein. Those symbols determine the direction for control of the carriage in conjunction with the contextual relationships described hereinabove.

While I have described and illustrated various specific embodiments of my invention, it will be clear that variations of the details of construction which are specifically illustrated and described may be resorted without departing from the true spirit and scope of the invention as defined in the appended claims.

I claim:

1. A computer-operated method for minimizing the number of keyboard key strokes required at a data entry keyboard to display two-dimensional figures at a display controlled by said computer, which display is subdivided into multiple two-dimensionally arrayed grid locations, said figures being made up of plural individual segments to be entered from said keyboard and displayed in individual display grid locations, some of said segments taking the form of alphanumeric characters having corresponding keys at said keyboard, others of said segments taking the form of directional symbols having forward and rearward ends and which, when displayed, link displayed alphanumeric characters and extend in respective horizontal, vertical and diagonal directions on said display, said method comprising the steps of:

(a) entering into the computer digital signals representing individual figure segments actuated in succession at said keyboard;

(b) storing within said computer a stored array of entered characters with locations corresponding to respective grid locations in said display;

(c) establishing a movable cursor grid location at said display;

(d) examining each segment entered into said computer to determine the form of the entered segment;

(e) in response to the entry of a display control character into said computer, effecting a corresponding display control function and moving the cursor grid location as prescribed by said corresponding control function;

(f) examining in said computer the contents of the present cursor grid location and (1) in response to the presence of a blank in the present cursor grid location and to entry into said computer of a figure segment corresponding to an alphanumeric character to be displayed, displaying said character under computer control at the present cursor grid location;

(2) in response to the presence of a blank in the present cursor grid location and to entry into said computer of a component which corresponds to a directional symbol: automatically displaying a prescribed figure segment, other than the entered segment, at the present cursor grid location under control of the computer; moving the cursor grid location under computer control to a new grid location one space in the direction of the directional symbol represented by the entered figure segment; and displaying the directional symbol represented by the entered figure segment at the new cursor grid location.

2. The method according to claim 1, wherein said prescribed figure segment is a dot.

3. The method according to claim 1 wherein step (f) further includes the steps of:
(f)(3) in response to the presence of one of said figure segments in the present cursor display grid location and to the entry into said computer of a figure segment which represents an alphanumeric character to be displayed: with the computer, moving the cursor display grid location under computer control one grid space in a prescribed location to a new cursor grid location; and displaying the entered alphanumeric character segment at the new cursor grid location.

4. The method according to claim 3 wherein, in step (f)(3), in response to the present cursor grid location containing a directional symbol, causing said prescribed direction to be the direction represented by that directional symbol.

5. The method according to claims 3 or 4, wherein in step (f)(3), in response to the present cursor grid location containing an alphanumeric character, causing said prescribed direction to be horizontal and to the right as viewed on the display grid.

6. The method according to claims 1 or 3 wherein step (f) further comprises the steps of:
(f)(4) in response to the presence of an alphanumeric character in the present cursor display grid location and to the entered figure segment corresponding to a directional symbol: moving the cursor grid location under computer control to a new cursor grid location one grid space in the direction of the entered directional symbol segment; and in response to the absence at the new cursor grid location of a directional symbol directed oppositely to the entered directional symbol, displaying the entered directional symbol in the new cursor grid location.

7. The method according to claim 6, wherein step (f)(4) further comprises the step of: in response to the new cursor grid location containing a directional symbol directed oppositely to the entered directional symbol, moving the cursor grid location under computer control another grid space in the direction of the entered directional symbol without displaying the entered directional symbol.

8. The method according to claim 6, wherein step (f) further includes the steps of:
(f)(5) in response to the entered element corresponding to a directional symbol and to the presence in the present cursor display grid location of a directional symbol which is neither identical to nor directed oppositely to the entered directional symbol: moving the cursor grid location under computer control from the present grid location to a new cursor grid location positioned one space in the direction of the directional symbol in the present cursor grid location; displaying said prescribed figure segment at the new cursor grid location; moving the cursor grid location again to a further cursor grid location disposed one space from the new cursor grid location in the direction of the entered directional symbol; and displaying the entered directional symbol at the further cursor grid location.

9. The method according to claim 8, wherein step (f) further includes the steps of:
(f)(6) in response to the entered element corresponding to a directional symbol which is identical to the entered directional symbol: moving the cursor grid location under computer control one space in the direction of the entered directional symbol to a new cursor location; and displaying the entered directional symbol at the new cursor grid location.

10. The method according to claim 8, wherein step (f) further includes the step of:
(f)(7) in response to the entered element corresponding to a directional symbol and to the present cursor location containing a directional symbol which is directed oppositely to the entered directional symbol: moving the cursor location one space in the direction of the entered directional symbol without displaying the entered directional symbol.

11. The method according to claims 1 or 3, wherein step (f) further includes the steps of:
in response to the entered figure segment corresponding to a directional symbol and to the present cursor display grid location containing a directional symbol which is neither identical to nor directed oppositely to the entered directional symbol: moving the cursor grid location under computer control from the present grid location to a new grid location positioned one space in the direction of the directional symbol in the present grid location; displaying said prescribed figure segment at the new cursor grid location; moving the cursor grid location again under computer control to a further cursor location disposed one space from the new cursor grid location in the direction of the entered directional symbol; and displaying the entered directional symbol at the further cursor grid location.

12. The method according to claims 1 or 3, wherein said two-dimentional figures are formed as chemical structures in which said alphanumeric characters to be displayed include representations of chemical atoms and wherein said directional symbols represent bonds between said atoms.

13. The method according to claim 12, further comprising the step of automatically displaying the alphanumeric symbol representing a predetermined atom, along with appropriate subscript notations designating the number of predetermined atoms present, adjacent another chemical atom when the display of said another chemical atom has insufficient chemical bond elements displayed adjacent thereto.

14. A computer-operated method of minimizing the number of key strokes required at a data entry keyboard to display two-dimensional figures at a display controlled by said computer, which display is subdivided into multiple two-dimensionally arrayed grid locations, said figures being made up of plural individual figure segments to be entered from said keyboard and displayed in individual display grid locations, some of said figure segments taking the form of alphanumeric characters having corresponding keys at said keyboard, others of said segments taking the form of directional symbols having forward ends and rearward ends and which, when displayed, link displayed alphanumeric characters and extend in respective horizontal, vertical and diagonal directions on said display, said method comprising the steps of:

(a) entering into the computer digital signals representing individual figure segments actuated in succession at said keyboard;

(b) storing within said computer a stored array of entered characters with locations corresponding to respective grid locations in said display;

(c) establishing a movable cursor grid location at said display;

(d) examining each segment entered into said computer to determine the form of the entered segment;

(e) in response to the entry of a display control character into said computer, effecting a corresponding display control function and moving the cursor grid location as prescribed by said corresponding control function;

(f) in response to the presence of an alphanumeric character in the present cursor display grid location and to the entry into said computer of a figure segment corresponding to a directional symbol: moving the cursor grid location under computer control to a new cursor grid location one grid space in the direction of the entered directional symbol; and in response to the absence at the new cursor grid location of a directional symbol directed oppositely to the entered directional symbol, displaying the entered directional symbol in the new cursor grid location at said display.

15. The method according to claim 14, wherein step (f) further comprises the step of: in response to the new cursor grid location containing a directional symbol directed oppositely to the entered directional symbol, moving the cursor grid location under computer control another grid space in the direction of the entered directional symbol without displaying the entered directional symbol.

16. A computer-operated method for minimizing the number of keyboard key strokes required at a data entry keyboard to display two-dimensional figures at a display controlled by said computer, which display is subdivided into multiple two-dimensionally arrayed grid locations, said figures being made up of plural individual segments to be entered from said keyboard and displayed in individual display grid locations, some of said segments taking the form of alphanumeric characters having corresponding keys at said keyboard, others of said segments taking the form of directional symbols having forward and rearward ends and which, when displayed, link displayed alphanumeric characters and extend in respective horizontal, vertical and diagonal directions on said display, said method comprising the steps of:

(a) entering into the computer digital signals representing individual figure segments actuated in succession at said keyboard;

(b) storing within said computer a stored array of entered characters with locations corresponding to respective grid locations in said display;

(c) establishing a movable cursor grid location at said display;

(d) examining each segment entered into said computer to determine the form of the entered segment;

(e) in response to the entry of a display control character into said computer, effecting a corresponding display control function and moving the cursor grid location as prescribed by said corresponding control function;

(f) in response to the entered element corresponding to a directional symbol and to the presence in the present cursor display grid location of a directional symbol which is neither identical to nor directed oppositely to the entered directional symbol: moving the cursor grid location, under computer control, from the present cursor grid location to a new grid location positioned one space in the direction of the directional symbol in the present cursor grid location; displaying said prescribed figure segment at the new cursor grid location; moving the cursor grid location under computer control to a further cursor grid location disposed one space from the new cursor grid location in the direction of the entered directional symbol; and displaying the entered directional symbol at the further cursor location.

17. A computer-operated method of minimizing the number of key strokes required at a keyboard to display two-dimensional chemical formula figures in a two-dimensional array, said chemical formula figures comprising individual figure segments in the form of alphanumeric characters and chemical bonds interconnecting the alphanumeric characters, said bonds comprising horizontal, vertical and diagonal lines, each figure segment, when displayed, occupying a respective grid location in a display grid, wherein said display includes means for designating the intended grid location to receive the next figure segment entered at said keyboard, said method comprising the steps of:

entering said figure segments individually into said computer from said keyboard;

examining each figure segment entered into said computer;

in response to the entered figure segment corresponding to a display control character, effecting the corresponding display control function at said computer;

in response to the entered figure segment corresponding to a character representing a chemical atom, displaying that character in the intended grid location under computer control;

in response to the entered figure segment corresponding to a chemical bond and further in response to the grid location for the most recently-displayed figure segment not containing a blank space, displaying the entered chemical band at the intended grid location under computer control; and in response to the entered figure segment corresponding to a chemical bond and further in response to a blank space at the grid location for the most recently-displayed figure segment, displaying a prescribed character in said intended grid location and then displaying the entered chemical bond segment at a grid location adjacent said intended grid location.

* * * * *